(12) United States Patent
Fransen et al.

(10) Patent No.: US 11,036,786 B2
(45) Date of Patent: Jun. 15, 2021

(54) DETERMINING USER SEGMENTATION BASED ON A PHOTO LIBRARY

(71) Applicant: Adobe Inc., San Jose, CA (US)

(72) Inventors: Peter Raymond Fransen, Soquel, CA (US); Tara V. Anand, Chappaqua, NY (US); Sarah Marie Garcia, Pembroke Pines, FL (US)

(73) Assignee: Adobe Inc., San Jose, CA (US)

( * ) Notice: Subject to any disclaimer, the term of this patent is extended or adjusted under 35 U.S.C. 154(b) by 191 days.

(21) Appl. No.: 16/277,810

(22) Filed: Feb. 15, 2019

(65) Prior Publication Data

US 2020/0265080 A1 Aug. 20, 2020

(51) Int. Cl.
*G06F 16/58* (2019.01)
*G06Q 30/02* (2012.01)
*G06F 21/62* (2013.01)
*G06F 16/535* (2019.01)

(52) U.S. Cl.
CPC ............ *G06F 16/58* (2019.01); *G06F 16/535* (2019.01); *G06F 21/6254* (2013.01); *G06Q 30/0251* (2013.01)

(58) Field of Classification Search
CPC ... G06Q 30/0251; G06F 16/58; G06F 16/535; G06F 21/6254; G06F 21/62; G06F 16/51
See application file for complete search history.

(56) References Cited

U.S. PATENT DOCUMENTS

| 2011/0072047 | A1* | 3/2011 | Wang | G06F 16/58 707/776 |
| 2012/0213445 | A1* | 8/2012 | Luu | G06F 16/58 382/218 |
| 2013/0007667 | A1* | 1/2013 | Sauve | G06F 16/54 715/838 |
| 2018/0307859 | A1* | 10/2018 | LaFever | G16H 10/60 |

* cited by examiner

*Primary Examiner* — Syed Haider
(74) *Attorney, Agent, or Firm* — FIG. 1 Patents (57) ABSTRACT

In implementations of determining user segmentation based on a photo library, a device maintains digital images in the photo library, as well as metadata associated with the digital images. The device includes a segmentation module implemented to determine characteristics about a user of the device by analysis of the metadata of the digital images. The segmentation module can determine a segmentation based on the characteristics determined about the user. The segmentation includes one or more segments that each represent a generalized aspect of the user, where a generalized aspect is attributable to multiple people and anonymity of the user is maintained. The segmentation module can associate an anonymous identifier with the segmentation effective to maintain the anonymity of the user and privacy of the metadata. The segmentation and the anonymous identifier can then be communicated to a marketing system that generates personalized marketing messages based on the segmentation.

20 Claims, 5 Drawing Sheets

DETERMINING USER SEGMENTATION BASED ON A PHOTO LIBRARY

BACKGROUND

Generally, determining insights about device users for marketing activity typically involves tracking the behavior and activities of the users, and storing this information over time by associating individual users with anonymous identifiers. This marketing data can then be supplemented with demographic information, often purchased from a third party, or integrated with a first-party customer relationship marketing (CRM) system. The combination of these datapoints enables the segmentation of users into groups that can then be targeted to receive specific marketing experiences or advertisements.

However, concerns regarding privacy, as well as a lack of general transparency, are prevalent issues with these current marketing techniques. Additionally, large online social media and social networking services are increasingly scrutinized for how they handle, and too often mis-handle, private user data. Many of the current marketing techniques and conventional methods of data collection are intentionally opaque and do not inform the general public, nor involve them, with any sort of indication as to the data that is being collected and stored about them. Further, centralized data collection can become a target for bad actors, and the data, which may be associated with or include personally identifiable information, can compound the detrimental effects of unauthorized access.

SUMMARY

This Summary introduces features and concepts of determining user segmentation based on a photo library, which is further described below in the Detailed Description and shown in the Figures. This Summary should not be considered to describe essential features of the claimed subject matter, nor used to determine or limit the scope of the claimed subject matter.

Aspects of determining user segmentation based on a photo library are described. In implementations, a device, such as a mobile phone or smartphone, can maintain digital images in the photo library, as well as metadata associated with the digital images. The device includes a segmentation module implemented to determine characteristics about a user of the device by analysis of the metadata of the digital images. The metadata associated with a digital image is information that provides context about the digital image, and can include descriptive information added by a user as well as information based on automated capture with a camera device. The characteristics about the user who is associated with the digital images can reveal insights about the user, as well as characteristics that can be inferred or determined about the user of the device who captured the digital images in the photo library.

The segmentation module can determine a segmentation based on the characteristics determined about the user. The segmentation includes one or more different segments that each represent a generalized aspect of the user, where a generalized aspect is attributable to multiple people and anonymity of the user is maintained. The segmentation module can then associate an anonymous identifier with the segmentation effective to maintain the anonymity of the user, as well as privacy of the metadata and the characteristics about the user. Notably, the metadata of the digital images and the determined characteristics of the user are maintained as private source information that is not collected, distributed, or combined with other source information from other user devices so as to prevent revealing any identity or specific characteristic of the user who is associated with the digital images in the photo library. The segmentation and the anonymous identifier can be communicated to a marketing system that generates personalized marketing messages based on the segmentation.

In other aspects of determining user segmentation based on a photo library, permission can be requested from the user of the device to access the digital images in the photo library. The segmentation module may then receive the user permission to access the digital images in the photo library, such as in the form of an input via a user interface on a display of the device. Notably, the user permission may be received as various forms of permission, such as to access all of the digital images in the photo library, access only the digital images in the photo library that have been designated for access, or access only the digital images in the photo library that have been designated as favorite photos. The user of the device may also deselect some of the digital images, which are then omitted from being accessed by the segmentation module and from the subsequent segmentation analysis.

BRIEF DESCRIPTION OF THE DRAWINGS

Implementations of determining user segmentation based on a photo library are described with reference to the following Figures. The same numbers may be used throughout to reference similar features and components that are shown in the Figures.

DETAILED DESCRIPTION

Implementations of determining user segmentation based on a photo library are described, and provide a system for user segmentation by leveraging metadata associated with digital images in a photo library on a mobile device, such as a mobile phone or smartphone. The described techniques collect the metadata (also referred to as photo metadata) from the photo library on the mobile device, which may be accessed after having requested and receiving permission to access the digital images from a user of the device who is associated with the digital images. Insights about the user can then be determined on the mobile device itself utilizing client-side analytical algorithms to determine a segmentation that represents characteristics about the user of the device who is associated with the digital images. In implementations, only the segmentation output along with an anonymous identifier is then communicated to an external marketing system, such as owned and operated by a marketer.

Notably, the insights learned about the user from the photo metadata would typically be difficult or maybe impossible to gather using conventional methods of data collection and analysis. Further, the user of the device can be provided with accurate and relatable marketing messages for an overall better user experience because the segmentation that represents the user is based on actual user data, rather than receiving targeted advertisements that are derived as a generic guess and are not particularly relatable to the user. Additionally, the described techniques of determining user segmentation based on a photo library is user-friendly and takes very little to no involvement from the user, as opposed to the user being requested to fill out a survey and answer multiple questions in an effort to obtain the same or similar information.

Unlike the current marketing techniques and conventional methods of data collection, the dataset (e.g., the digital images) on which the segmentation is based is localized on the mobile device of the user, and only the derived segments that each represent a generalized, generic aspect about the user are communicated externally from the device. Notably, the digital images, the associated metadata, and any specific insights and characteristics determined about the user are maintained on the mobile device itself and are not collected or distributed. This significantly enhances the privacy and security of personally identifiable information associated with the user, and overall, users are not compromised in the event of potential data breaches. Further, the described techniques are transparent, informing the user of the segmentation process based on the digital images in the photo library, and providing the user control over precisely what information is being collected by allowing the user to not only grant or deny access permission, but also control over which of the digital images can be accessed and which ones are not to be accessed or included in the segmentation process.

In aspects of determining user segmentation based on a photo library, a mobile device (e.g., a mobile phone, smartphone, or any type of computing device) can include a segmentation module that is implemented to access metadata associated with digital images in a photo library that is maintained on the device. The segmentation module can determine characteristics about a user of the mobile device by analysis of the metadata of the digital images. The segmentation module can then determine a segmentation based on the characteristics determined about the user, where the segmentation includes one or more different segments that each represent a generalized aspect of the user. The segmentation module can then associate an anonymous identifier with the segmentation effective to maintain the anonymity of the user, as well as privacy of the metadata and the characteristics about the user. Notably, the metadata of the digital images and the determined characteristics of the user are maintained as private source information that is not collected, distributed, or combined with other source information from other user devices so as to prevent revealing any identity or specific characteristic of the user who is associated with the digital images in the photo library. The segmentation and the anonymous identifier can be communicated to a marketing system that generates personalized marketing messages based on the segmentation.

As described herein, the "metadata" or "photo metadata" is information that provides context about a digital image, and is information that can be stored and communicated with an image file of a digital image. The metadata associated with a digital image can include descriptive information added by a user, as well as information based on automated capture with a camera device, such as an identifier of the photo, the date and time of day a photo is captured, a geolocation of where the photo is captured, dimensions and photographic properties of the photo (e.g., lens aperture, focal length, shutter speed, lighting, etc.), a stored location of the photo, keywords that identify content captured in the photo image, rights management information (e.g., copyright and access), and/or any other type of information about a digital image. It should be noted that, although aspects of determining user segmentation based on a photo library is shown and described with reference to digital images, the techniques described herein may be adapted to determine user segmentation based on a music library, a book library, or other similar types of data library collections that may offer insights to a user of a mobile device.

The "characteristics" that can be determined about a user who is associated with the digital images can reveal insights about the user. For example, the characteristics may indicate the different geolocations where the digital images have been captured; a period of the day (e.g., in the morning, in the evening, etc.) when a majority of the digital images were captured; trends associating the geolocations and timing of the camera activity; an indication that the user has an affinity for a particular holiday, other significant calendar days, or World events; that the user is a sports fan, auto enthusiast, or follows other topics; an indication that the person is a morning person, or is a shift-worker and active during the evening and late night hours; and any other characteristics that can be inferred or determined about the user who captured the digital images in the photo library on the device. Although the characteristics can represent a specific profile and interests of the specific user, this information may include some of the metadata and is maintained as private source information on the device.

The term "segmentation" as used herein represents the user who is associated with the digital images in the photo library based on the characteristics determined about the user. The segmentation can include one or more different segments that each represent a generalized aspect of the user, where a generalized aspect is attributable to multiple people and anonymity of the user is maintained. For example, the known geolocations where the user has traveled (e.g., a characteristic) includes information from the private metadata, which is maintained confidential, whereas determinations that the user is a World traveler, likely of a certain age group, and attributed with a particular income (e.g., segments of the segmentation) are all generalized attributes that may apply to many people, without revealing the actual income, age, or where the person has traveled specifically.

While features and concepts of determining user segmentation based on a photo library can be implemented in any number of different devices, systems, networks, environments, and/or configurations, implementations of determining user segmentation based on a photo library are described in the context of the following example devices, systems, and methods.

Figure 1:
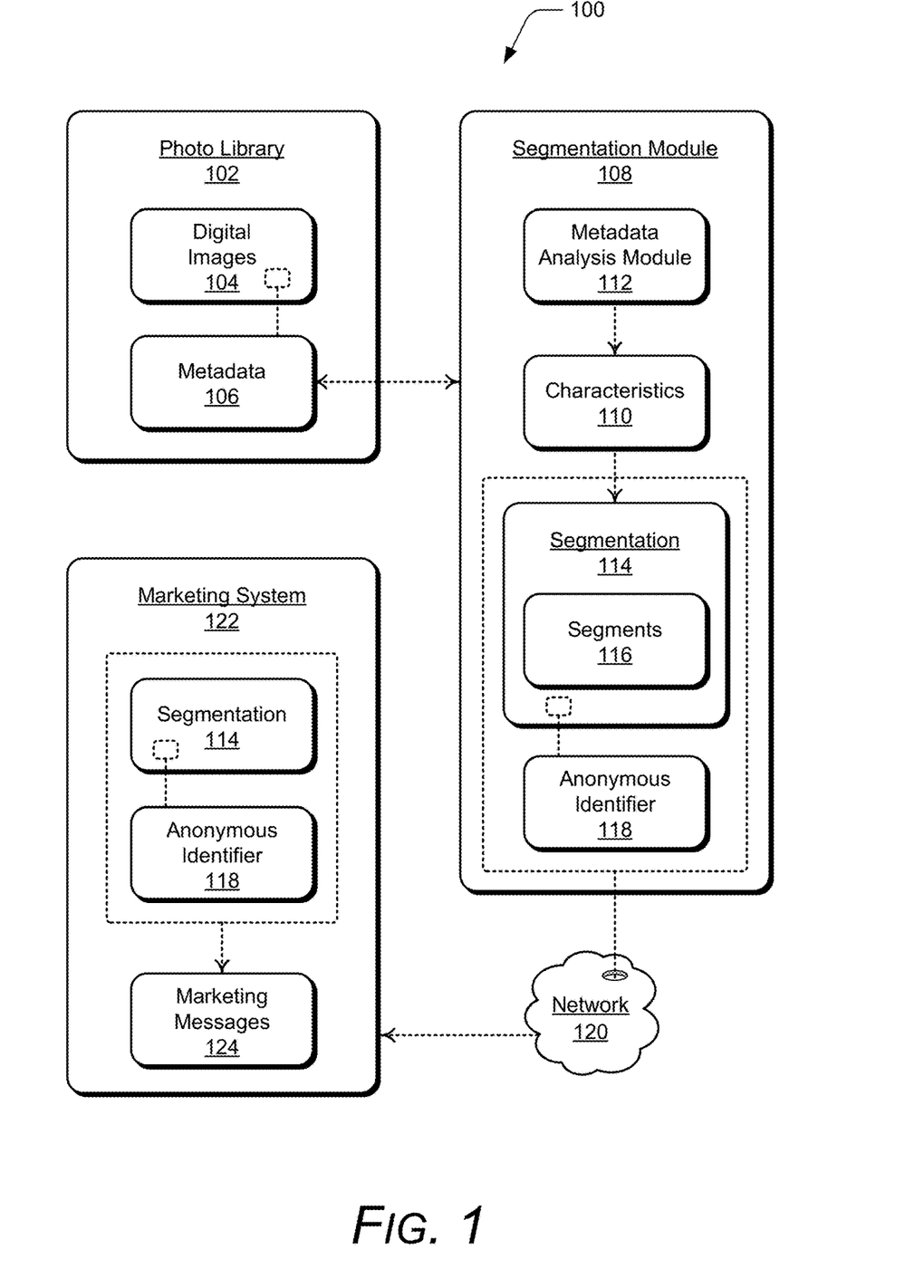
FIG. 1 illustrates an example environment in which aspects of determining user segmentation based on a photo library can be implemented.

FIG. 1 illustrates an example environment 100 in which aspects of determining user segmentation based on a photo library can be implemented. The example environment 100 includes a photo library 102 of digital images 104, such as may be stored in memory on any type of computing device, as further shown and described in more detail with reference to FIG. 3. The digital images 104 are representative of any type of photos captured by a person with a digital camera, such as may be implemented in a mobile phone, tablet device, digital camera, or any other type of consumer, electronic, and/or computing device. In this example, the photo library 102 also includes metadata 106 that is associated with the digital images 104 in the photo library 102. Generally, the metadata 106 associated with a digital image 104 is information that provides context about the digital image. The metadata 106 of a digital image 104 (also referred to as "photo metadata") is information that can be stored and communicated with an image file of a digital image.

Notably, the metadata 106 may include descriptive information about a digital image added by a user, such as by the person who captured the photo. The metadata 106 can also include information that is added to an image file based on automated capture with a camera device, such as an identifier of the photo, the date and time of day a photo is captured, a geolocation of where the photo is captured, dimensions and photographic properties of the photo (e.g., lens aperture, focal length, shutter speed, lighting, etc.), a stored location of the photo, keywords that identify content captured in the photo image, rights management information (e.g., copyright and access), and/or any other type of information about a digital image.

The example environment 100 also includes a segmentation module 108 that is implemented to determine characteristics 110 about a person who is associated with the digital images 104 based on analysis of the metadata 106 of the digital images in the photo library 102. The segmentation module 108 can be implemented as any type of module or component in software and/or hardware, as a standalone application or as a module or component of another device application, and in any type of computing device, as further shown and described in more detail with reference to FIG. 3. Additionally, the segmentation module 108 can implement or include a metadata analysis module 112 that is designed to analyze the metadata 106 of the digital images 104 and determine the characteristics 110 about the person who is associated with the digital images. The metadata analysis module 112 can be implemented as a manually created rule sets, or may be automatically learned over time, such as by using machine learning and/or training a neural network.

The metadata analysis module 112 can be implemented as any type of machine learning or neural network with trained classifiers, such as in software and/or in hardware in any type of computing device. The machine learning can be implemented as any type of a neural network or machine learning model, referring to a computer representation that can be tuned or trained based on inputs to approximate unknown functions. In particular, the term "machine learning model" can include a model that utilizes algorithms to learn from, and make predictions on, known data by analyzing the known data to learn to generate outputs that reflect patterns and attributes of the known data. For instance, a machine-learning model can include but is not limited to, decision trees, support vector machines, linear regression, logistic regression, Bayesian networks, random forest learning, dimensionality reduction algorithms, boosting algorithms, artificial neural networks, deep learning, and the like. Thus, a machine-learning model makes high-level abstractions in data by generating data-driven predictions or decisions from the known input data. In this example environment 100, the input data is the metadata 106 of the digital images 104 from which the characteristics 110 of the person associated with the digital images is determined.

The characteristics 110 that can be determined about a person who is associated with the digital images 104 can reveal insights about the person, and may include a listing of the different geolocations where the digital images 104 have been captured; a determination of when a majority of the digital images 104 were captured (e.g., in the morning, in the evening, during particular months or seasons, etc.); trends associating the geolocations and timing of the camera activity; a determination that the person has an affinity for a particular holiday, other significant calendar days, or World events; a determination that the person is a sports fan based on photos captured at sporting events, or the person is an auto enthusiast based on photos of automobiles or new car shows; a determination that the person is a morning person, or is a shift-worker and active during the evening and late night hours; insights learned from the digital images that have been designated as favorite photos, which may be given more weight in the segmentation process to increase the accuracy of the segmentation or insights; a percentage of the digital images selected as the favorite photos may indicate that the person is part of a younger demographic, noting a relationship between the percentage of favorited photos and an age of the person associated with the photos; device applications used to access the camera and capture the digital images (e.g., social media applications may have a particularly inherent "signature", such as image size); and any other characteristics that can be inferred or determined about the person who captured the digital images 104 in the photo library 102.

Although the characteristics 110 can represent a specific profile and interests of the specific person, this information is maintained as private source information by the segmentation module 108. Notably, the characteristics 110 of the person, which may include some of the metadata 106 and specific determinations about the person, are maintained as private source information, and it is not collected, distributed, or combined with other source information associated with other people or user devices.

The segmentation module 108 is also implemented to determine a segmentation 114 that represents the person who is associated with the digital images 104 based on the characteristics 110 determined about the person. The segmentation module 108 may also determine the segmentation 114 based on inspection of the digital images themselves (e.g., with access permission from the user) using photo extraction and/or machine learning techniques to ascertain generalized features, such as common colors captured in the digital images, the number of people captured in the images, the general nature of the subject matter captured in the images, camera shutter speeds, etc. This can lead to more effective learning and determinations regarding preferred colors or aesthetics that can be used to perform personalization.

Generally, the segmentation 114 can include one or more segments 116 that each represent a generalized aspect about the person, which may be attributable to multiple people. For example, from the characteristic of the known geolocations where the digital images 104 have been captured, one or more segments 116 may be determined or inferred that the person is a frequent traveler, a World traveler, makes a particular income, is likely in a certain age group, and any other type of generalized aspect about the person. Notably, the known geolocations where the person has traveled (e.g., a characteristic 110) includes information from the private metadata 106, which is maintained confidential, whereas a determinations that the person is a World traveler, likely of a certain age group, and attributed with a particular income (e.g., segments of the segmentation) are all generalized attributes that may apply to many people, without revealing the actual income, age, or where the person has traveled specifically.

Generally, segmentation is a process of aggregating large sets of users (e.g., device users) based on similarity. However, rather than collecting a large amount of aggregated data from multiple computing devices and then labeling the segments, aspects of determining user segmentation based on a photo library as described herein is designed to determine segments that represent each person individually, and then determine one or more user groups that a person may be associated with based on the segmentation determinations. In terms of overall marketing, market segmentation is a term referring to aggregating users into groups, or segments, that are perceived to have common needs, interests, and priorities, and tend to respond similarly to a marketing action. In other aspects of marketing, segmentation addresses the notion that different market segments of people respond differently to various marketing programs, such as different offers, promotions, pricing variances, distribution models, or any combination of marketing variables. Aspects of market segmentation seeks to develop and determine profiles of the different segment types in order to market to peoples' needs and purchase motivations, and the insights gained from segmentation analysis can be used to derive marketing strategies and targeted messaging.

The segmentation 114 that represents the person who is associated with the digital images 104 can be maintained on a device that implements the segmentation module 108 and/or may be communicated to a server device for marketing analytics, and to perform various marketing or personalization activities. In the example environment 100, the segmentation module 108 is also implemented to mask the segmentation 114 to maintain anonymity of the person, as well as privacy of the characteristics 110 and the metadata 106 that is associated with the digital images 104 in the photo library 102. For example, the segmentation module 108 can associate an anonymous identifier 118 with the segmentation 114 so as to prevent revealing any identity or specific characteristic of the person. Notably, the metadata 106 of the digital images 104 is maintained as private source information, and it is not collected, distributed, or combined with other source information from other people or user devices.

In implementations, the generalized segmentation 114 and the anonymous identifier 118 can be communicated via a network 120 to a marketing system 122, where the marketing system may generate personalized marketing messages 124 based on the segmentation. The marketing messages 124 can be communicated from the marketing system 122 to one or more computing devices (e.g., a mobile phone, tablet device, etc.) of the person who is associated with the digital images 104 in the photo library 102, from which the segmentation 114 was derived. With reference to geolocation mapping, predefined latitude/longitude fences may be downloaded and run by the segmentation module 108 on a mobile device of the user, returning indications as to whether the user aligns with any predefined geolocation fences, which can also be used for marketing purposes and to reveal if users are located near particular retail stores and shops.

In implementations, the marketing system 122 is representative of a cloud-based service that provides a service and/or from which data and information is available, such as via the Internet, for on-line and/or network-based access. The marketing system 122 can be accessed on-line, and includes one or more hardware server devices (e.g., computing devices) that may be implemented in a network system. The marketing system 122 may include multiple data storage, server devices, and applications, and can be implemented with various components as further described with reference to the example device shown in FIG. 5.

Any of the devices, servers, and/or services described herein can communicate via the network 120, such as for data communication between user devices and cloud-based servers. The network 120 can be implemented to include a wired and/or a wireless network. The network can also be implemented using any type of network topology and/or communication protocol, and can be represented or otherwise implemented as a combination of two or more networks, to include IP-based networks and/or the Internet. The network 120 may also include mobile operator networks that are managed by a mobile network operator and/or other network operators, such as a communication service provider, mobile phone provider, and/or Internet service provider.

Example methods 200 and 400 are described with reference to respective FIGS. 2 and 4 in accordance with one or more aspects of determining user segmentation based on a photo library. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 2:
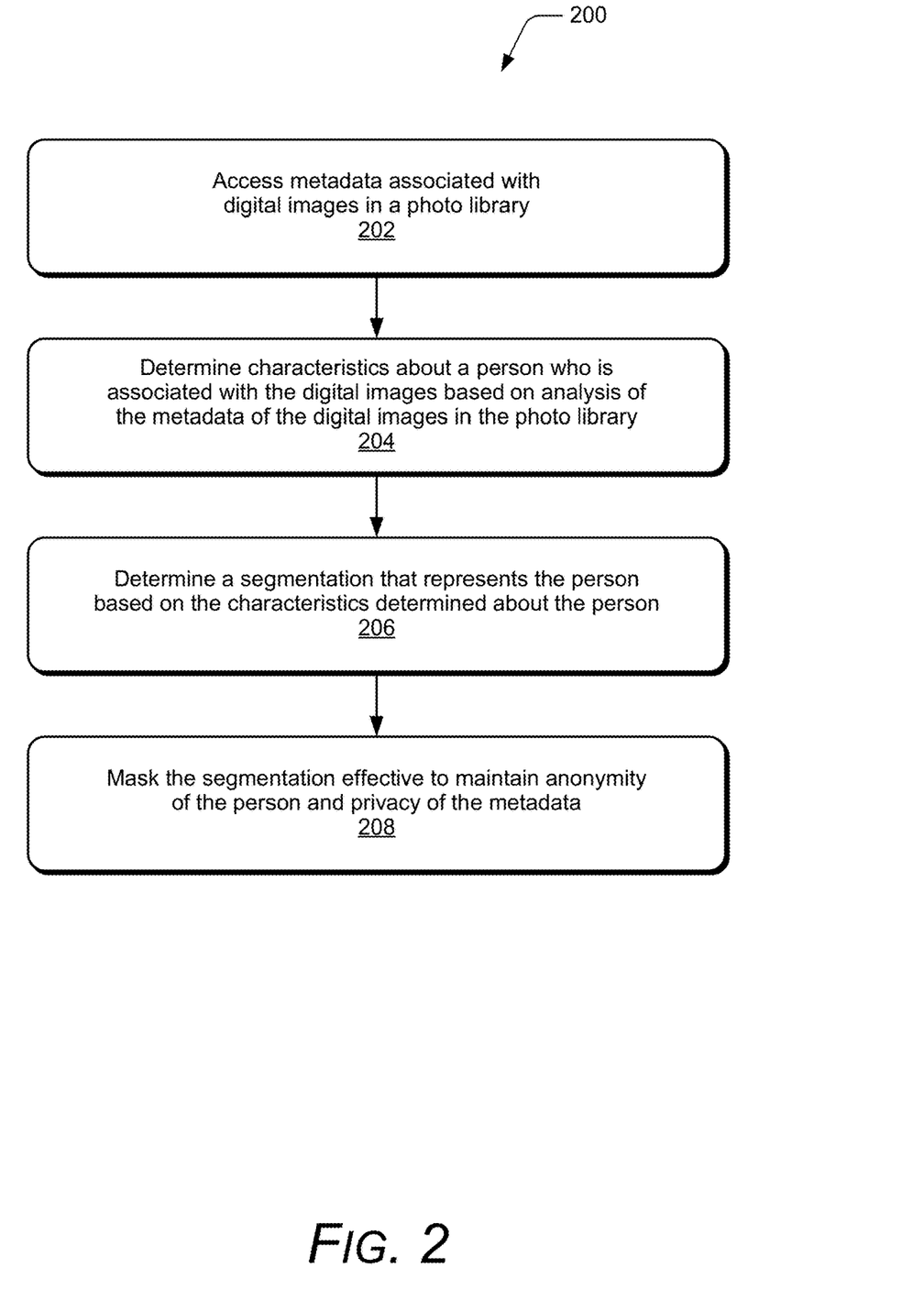
FIG. 2 illustrates an example method of determining user segmentation based on a photo library in accordance with one or more implementations.

FIG. 2 illustrates example method(s) 200 for determining user segmentation based on a photo library, and is generally described with reference to the segmentation module as shown and described with reference to FIG. 1. The order in which the method is described is not intended to be construed as a limitation, and any number or combination of the method operations can be combined in any order to implement a method, or an alternate method.

At 202, the metadata associated with digital images in a photo library is accessed. For example, the segmentation module 108 accesses the metadata 106 of the digital images 104 in the photo library 102, as shown and described with reference to FIG. 1. The metadata 106 can include any information about the digital images 104, and provides context about the digital images. The metadata 106 of a digital image 104 (also referred to as "photo metadata") is information that can be stored and communicated with an image file of a digital image. Notably, the metadata 106 may include descriptive information added by a user, such as by the person who captured a photo. Additionally, the metadata 106 associated with a digital image can also include information that is added to an image file based on automated capture by a camera device.

At 204, characteristics about a person who is associated with the digital images are determined based on analysis of the metadata of the digital images in the photo library. For example, the segmentation module 108 determines the characteristics 110 about the person who is associated with the digital images 104 based on analysis of the metadata 106 of the digital images 104 in the photo library 102. Notably, the characteristics 110 about the person who is associated with the digital images 104 can reveal insights about the person, and may include any characteristics that can be inferred or determined about the person who captured the digital images 104 in the photo library 102. Although the characteristics 110 can represent a specific profile and interests of the specific person, this information is maintained as private source information by the segmentation module 108, and the characteristics 110 of the person are not collected, distributed, or combined with other source information associated with other people or user devices.

At 206, a segmentation is determined that represents the person based on the characteristics determined about the person. For example, the segmentation module 108 determines the user segmentation 114 that represents the person based on the characteristics 110 determined about the person. The user segmentation 114 can include the segments 116 that each represent a generalized aspect of the person, where a generalized aspect of the person is attributable to multiple people and the anonymity of the person is maintained.

At 208, the segmentation is masked effective to maintain anonymity of the person and privacy of the metadata. For example, the segmentation module 108 masks the user segmentation 114, such as by associating the anonymous identifier 118 with the user segmentation 114 effective to maintain anonymity of the user, as well as privacy of the metadata 106 and the characteristics 110. Notably, the metadata 106 of the digital images 104 is maintained as private source information that is not collected, distributed, or combined with other source information from other user devices so as to prevent revealing any identity or specific characteristic of the person who is associated with the digital images 104 in the photo library 102.

Figure 3:
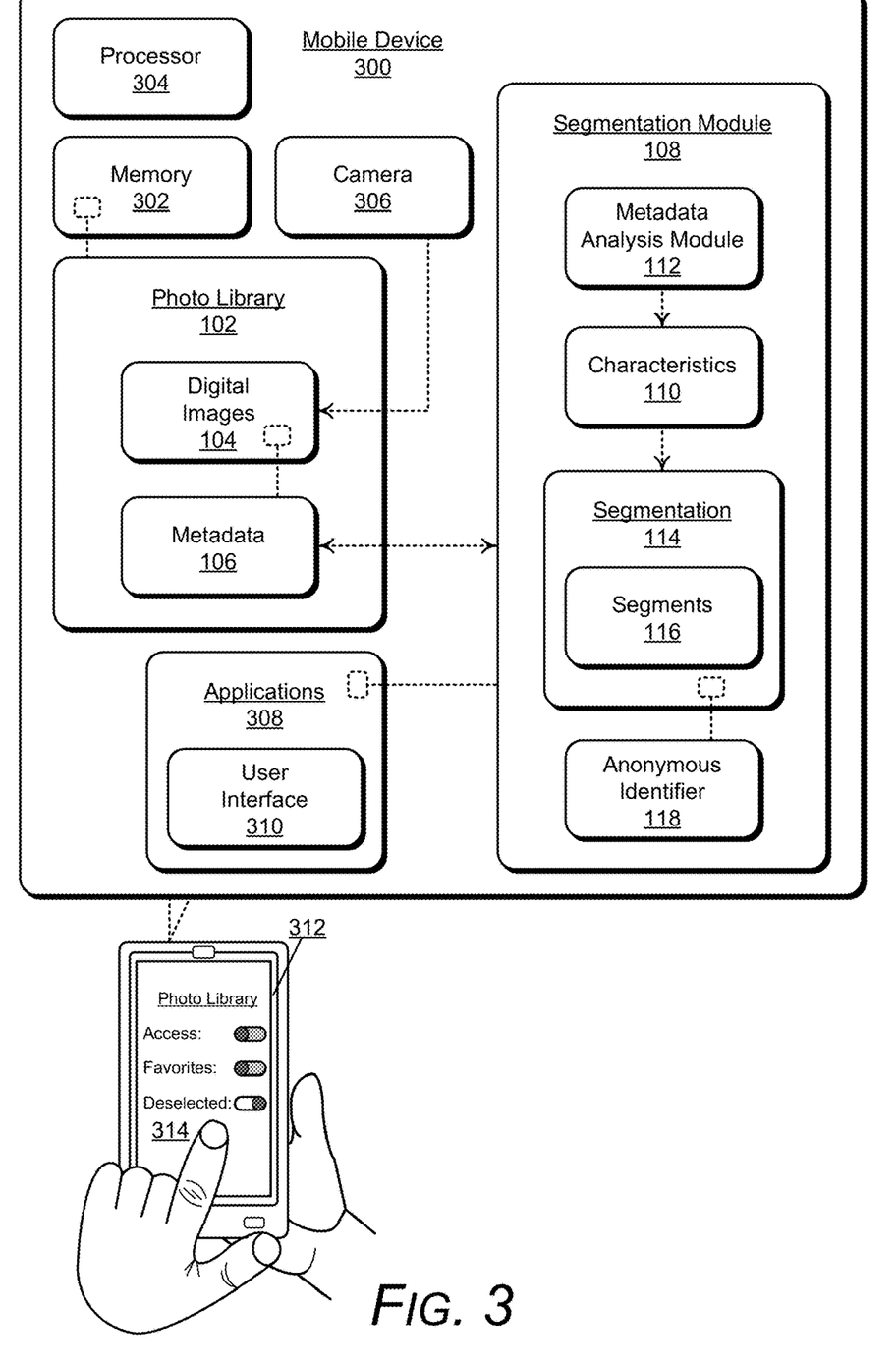
FIG. 3 illustrates an example device in which aspects of determining user segmentation based on a photo library can be implemented.

FIG. 3 illustrates an example mobile device 300, such as a mobile phone or smartphone, in which aspects of determining user segmentation based on a photo library can be implemented. The mobile device 300 can be implemented as any type of computing device, client device, mobile phone, tablet device, communication, entertainment, gaming, media playback, and/or other type of electronic and/or computing device. Additionally, the mobile device 300 may include any number and combination of different components as further described with reference to the example device shown in FIG. 5, such as memory 302 and a processor 304, as well as a camera 306 to capture the digital images 104. The memory 302 can be used to maintain the digital images 104 in the photo library 102, as well as the metadata 106 that is associated with the digital images. As noted above, the metadata 106 may include descriptive information about a digital image added by the user of the mobile device, and can also include information that is added to an image file based on automated capture by the camera 306.

The mobile device 300 implements the segmentation module 108, such as in software, in hardware, or as a combination of software and hardware components. The segmentation module 108 can be implemented as a software application or module, such as executable software instructions (e.g., computer-executable instructions) that are executable with a processing system (e.g., the processor 304) of the mobile device 300 to implement the techniques of determining user segmentation based on a photo library. The segmentation module 108 can be stored on computer-readable storage media, such as any suitable memory device (e.g., the device memory 302) or other electronic data storage implemented in the computing device.

In this example, the mobile device 300 includes applications 308, such as applications that have been downloaded to the mobile device, and the segmentation module 108 can be implemented as a module or software component of one or more of the device applications 308. In implementations, one of the device applications 308 may be a retail store application that a user of the device has download for shopping convenience via a user interface 310 of the application, such as to easily search for store products and receive special offers, notices, and marketing messages. In aspects of determining user segmentation based on a photo library as described herein, the user of the mobile device 300 can be provided with accurate and relatable marketing messages for an overall better user experience because the segmentation that represents the user is based on actual user data, rather than receiving targeted advertisements that are derived as a generic guess and are not particularly relatable to the user.

In implementations, the segmentation module 108 can initiate a request for permission from the user of the mobile device 300 to access the digital images 104 in the photo library 102. Notably, the privacy and security of the digital images 104 in the photo library 102 is enhanced by allowing the user of the device to specify whether all or only part of the digital images are accessible by the segmentation module 108 for segmentation analysis, as well as the digital images that are specifically designated as not being accessible and omitted from the segmentation analysis. For example, the request for permission can be displayed in the user interface 310 on a display 312 of the mobile device 300, and the user can respond with a user input 314 via the user interface, or by any other input technique.

The segmentation module 108 can receive the user input 314 as permission to access the digital images 104 in the photo library 102 on the mobile device. The user input 314 may also be received as user permission to access only the digital images 104 in the photo library 102 that have been designated for access by the user. Alternatively or in addition, the user input 314 may be received as user permission to access only the digital images 104 in the photo library 102 that have been designated as favorite photos. Alternatively or in addition, the user input 314 may designate one or more of the digital images 104 in the photo library 102 as being deselected and omitted from subsequent segmentation analysis by the segmentation module.

Based on the various distinctions of user permission, the segmentation module 108 can then access the metadata 106 of the digital images 104 in the photo library 102 that is maintained in the memory 302 on the mobile device 300. In implementations, the segmentation module 108 accesses the metadata 106 of the digital images 104 if the user permission to access the digital images 104 is received from the user who is associated with the mobile device. The segmentation module 108 can then determine the characteristics 110 about the user of the device based on analysis of the metadata 106 of the digital images 104 in the photo library 102. Notably, the characteristics 110 about the user who is associated with the digital images 104 can reveal insights about the user, and may include any characteristics that can be inferred or determined about the user who captured the digital images 104 in the photo library 102. Although the characteristics 110 can represent a specific profile and interests of the specific user, this information is maintained as private source information by the segmentation module 108 on the device, and the characteristics 110 of the user are not collected, distributed, or combined with other source information associated with other users or user devices.

The segmentation module 108 is implemented to determine the user segmentation 114 that correlates the user with one or more user groups based on the characteristics 110 determined about the user. The user segmentation 114 can include the different segments 116 that each represent a generalized aspect of the user, where the generalized aspect of the user is attributable to multiple people and the anonymity of the user is maintained. In implementations, the user may be provided with the segmentation indication to inform the user of the user segmentation 114 that correlates the user with the user groups. The segmentation module 108 can then associate the anonymous identifier 118 with the user segmentation 114 effective to maintain anonymity of the user, as well as privacy of the metadata 106 and the characteristics 110 on the mobile device.

Figure 4:
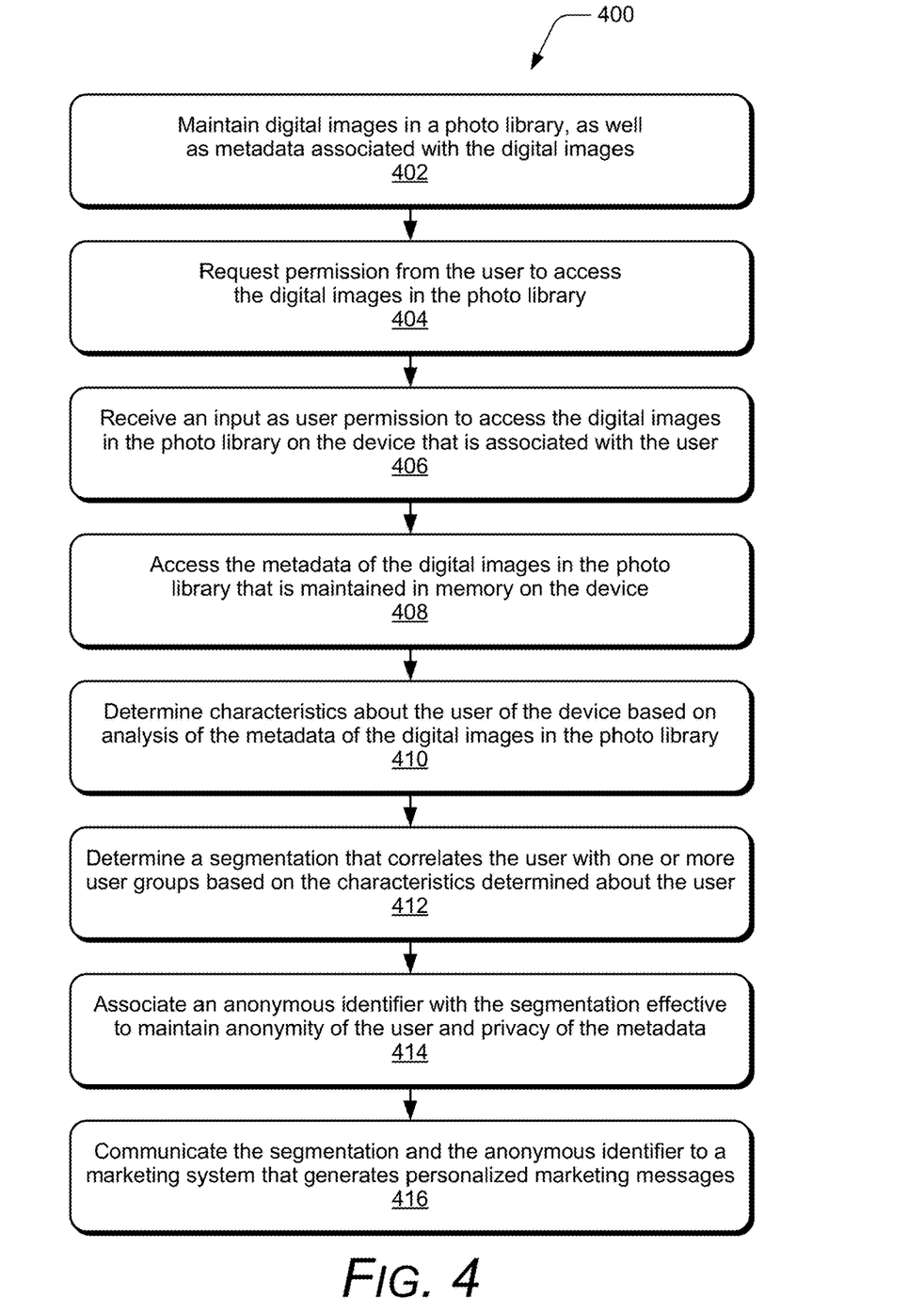
FIG. 4 illustrates an example method of determining user segmentation based on a photo library in accordance with one or more implementations.

FIG. 4 illustrates example method(s) 400 for determining user segmentation based on a photo library, and is generally described with reference to the segmentation module as shown and described with reference to FIGS. 1 and 3. The order in which the method is described is not intended to be construed as a limitation, and any number or combination of the method operations can be combined in any order to implement a method, or an alternate method.

At 402, digital images are maintained in a photo library, as well as metadata associated with the digital images. For example, the mobile device 300 includes the memory 302 used to maintain the digital images 104 in the photo library 102, as well as the metadata 106 associated with the digital images. Notably, the metadata 106 of the digital images 104 is maintained as private source information that is not collected, distributed, or combined with other source information from other user devices. The determination of a user segmentation 114 is based on just the photo library 102 associated with the user of the device, and the metadata 106 is not uploaded to a cloud-based server, such as the marketing system 122, or communicated from the mobile device.

At 404, permission is requested from the user to access the digital images in the photo library. For example, the segmentation module 108 implemented by the mobile device 300 initiates a request for permission from the user of the device to access the digital images 104 in the photo library 102. In implementations, the request for permission can be displayed in the user interface 310 on the display 312 of the mobile device 300 and the user can respond with an input via the user interface, or by any other input technique.

At 406, an input is received as user permission to access the digital images in the photo library on the device that is associated with the user. For example, the segmentation module 108 implemented by the mobile device 300 receives the user input 314 as permission to access the digital images 104 in the photo library 102 on the device. In implementations, the user input 314 may be received as user permission to access one or more of the digital images 104 in the photo library 102 that have been designated for access by the user. Alternatively or in addition, the user input 314 may be received as user permission to access only the digital images 104 in the photo library 102 that have been designated as favorite photos. Alternatively or in addition, the user input 314 may be received as one or more of the digital images 104 in the photo library 102 being deselected, which are then omitted from subsequent segmentation analysis by the segmentation module.

At 408, the metadata of the digital images in the photo library is accessed and, at 410, characteristics about the user of the device are determined based on analysis of the metadata of the digital images in the photo library. For example, the segmentation module 108 implemented by the mobile device 300 accesses the metadata 106 of the digital images 104 in the photo library 102 that is maintained in the memory 302 on the device. In implementations, the segmentation module 108 accesses the metadata 106 of the digital images 104 if the user permission to access the digital images 104 is received from the user who is associated with the device. The segmentation module 108 then determines the characteristics 110 about the user of the device based on analysis of the metadata 106 of the digital images 104 in the photo library 102. Notably, the characteristics 110 about the user who is associated with the digital images 104 can reveal insights about the user, and may include any characteristics that can be inferred or determined about the user who captured the digital images 104 in the photo library 102. Although the characteristics 110 can represent a specific profile and interests of the specific user, this information is maintained as private source information by the segmentation module 108 on the device, and the characteristics 110 of the user are not collected, distributed, or combined with other source information associated with other users or user devices.

At 412, a segmentation that correlates the user with one or more user groups is determined based on the characteristics determined about the user. For example, the segmentation module 108 implemented by the mobile device 300 determines the user segmentation 114 that correlates the user with one or more user groups based on the characteristics 110 determined about the user. The user segmentation 114 can include the different segments 116 that each represent a generalized aspect of the user, where the generalized aspect of the user is attributable to multiple people and the anonymity of the user is maintained. In implementations, the user may be provided with the segmentation indication to inform the user of the user segmentation 114 that correlates the user with the user groups.

At 414, an anonymous identifier is associated with the segmentation effective to maintain anonymity of the user and privacy of the metadata. For example, the segmentation module 108 implemented by the mobile device 300 associates the anonymous identifier 118 with the user segmentation 114 effective to maintain anonymity of the user, as well as privacy of the metadata 106 and the characteristics 110. In implementations, the anonymous identifier 118 can correlate with a device identifier that identifies the device for subsequent receipt of the personalized marketing messages 124.

At 416, the segmentation and the anonymous identifier are communicated to a marketing system that generates personalized marketing messages based on the segmentation into the one or more user groups. For example, the mobile device 300 communicates the user segmentation 114 and the anonymous identifier 118 to the marketing system 122 that generates the personalized marketing messages 124 based on the user segmentation 114 into the one or more user groups. The marketing messages 124 can be communicated from the marketing system 122 to the mobile device 300, or via the specific device application 308, for the user who is associated with the digital images 104 in the photo library 102, from which the segmentation 114 was derived.

Figure 5:
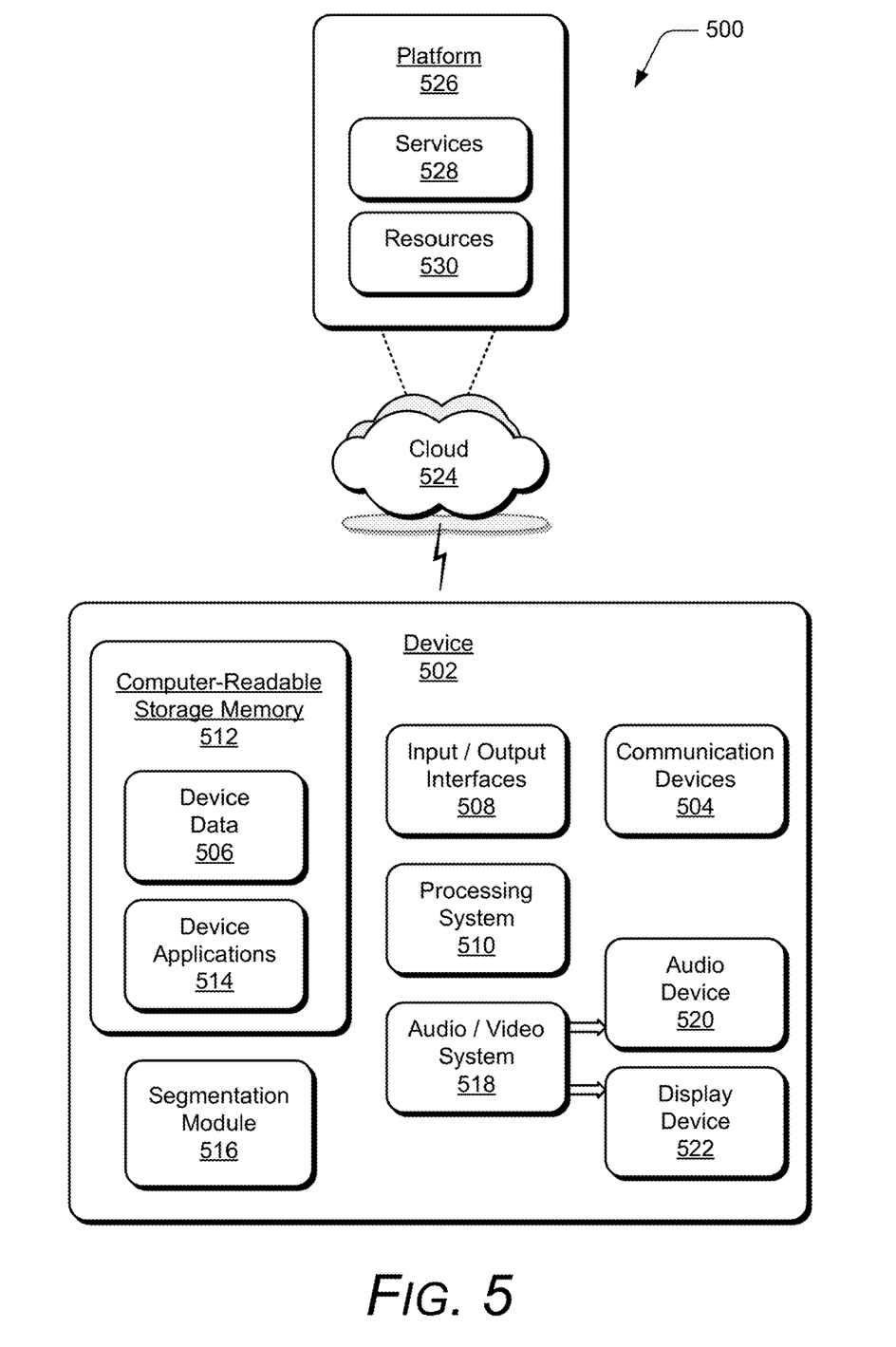
FIG. 5 illustrates an example system with an example device that can implement aspects of determining user segmentation based on a photo library.

FIG. 5 illustrates an example system 500 that includes an example device 502, which can implement techniques of determining user segmentation based on a photo library. The example device 502 can be implemented as any of the computing devices, mobile devices, server devices, and/or services described with reference to the previous FIGS. 1-4, such as any type of computing device, client device, mobile phone, tablet, communication, entertainment, gaming, media playback, and/or other type of device. For example, the mobile device 300 may be implemented as the example device 502.

The example device 502 includes communication devices 504 that enable wired and/or wireless communication of device data 506, such as the segmentation and anonymous identifiers, as well as computer applications data and content that is transferred from one computing device to another, and/or synched between multiple computing devices. The device data 506 can include any type of audio, video, image, and/or graphic data that is generated by applications executing on the device. The communication devices 504 can also include transceivers for cellular phone communication and/or for network data communication.

The device 502 also includes input/output (I/O) interfaces 508, such as data network interfaces that provide connection and/or communication links between the device, data networks, and other devices. The I/O interfaces can be used to couple the device to any type of components, peripherals, and/or accessory devices, such as a digital camera device and/or computer input device that may be integrated with the example device 502. The I/O interfaces also include data input ports via which any type of data, media content, and/or inputs can be received, such as user inputs to the device, as well as any type of audio, video, and/or image data received from any content and/or data source.

The device 502 includes a processing system 510 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 502 may further include any type of a system bus or other data and command transfer system that couples the various components within the device. A system bus can include any one or combination of different bus structures and architectures, as well as control and data lines.

The example device 502 also includes computer-readable storage memory 512, such as data storage devices implemented in hardware that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory 512 can include various implementations of random access memory (RAM), read-only memory (ROM), flash memory, and other types of storage memory in various memory device configurations.

The computer-readable storage memory 512 provides storage of the device data 506 and various device applications 514, such as an operating system that is maintained as a software application with the computer-readable storage memory and executed by the processing system 510. In this example, the device 502 includes a segmentation module 516 that implements the described techniques of determining user segmentation based on a photo library, and may be implemented with hardware components and/or in software as one of the device applications 514, such as when the example device 502 is implemented as the mobile device 300 shown in FIG. 3. An example of the segmentation module 516 includes the segmentation module 108 that is implemented as a software application and/or as hardware components, such as by the mobile device 300, and/or as shown and described with reference to FIGS. 1-4. In implementations, the segmentation module 516 may include independent processing, memory, and logic components as a computing and/or electronic device integrated with the device 502.

The device 502 also includes an audio and/or video system 518 that generates audio data for an audio device 520 and/or generates display data for a display device 522. The audio device and/or the display device include any devices that process, display, and/or otherwise render audio, video, display, and/or image data. In implementations, the audio device and/or the display device are integrated components of the example device 502. Alternatively, the audio device and/or the display device are external, peripheral components to the example device. In embodiments, at least part of the techniques described for determining user segmentation based on a photo library may be implemented in a distributed system, such as over a "cloud" 524 in a platform 526. The cloud 524 includes and/or is representative of the platform 526 for services 528 and/or resources 530. For example, the services 528 may include the marketing system 122 as shown and described with reference to FIG. 1.

The platform 526 abstracts underlying functionality of hardware, such as server devices (e.g., included in the services 528) and/or software resources (e.g., included as the resources 530), and connects the example device 502 with other devices, servers, etc. The resources 530 may also include applications and/or data that can be utilized while computer processing is executed on servers that are remote from the example device 502. Additionally, the services 528 and/or the resources 530 may facilitate subscriber network services, such as over the Internet, a cellular network, or Wi-Fi network. The platform 526 may also serve to abstract and scale resources to service a demand for the resources 530 that are implemented via the platform, such as in an interconnected device embodiment with functionality distributed throughout the system 500. For example, the functionality may be implemented in part at the example device 502 as well as via the platform 526 that abstracts the functionality of the cloud 524.

Although implementations of determining user segmentation based on a photo library have been described in language specific to features and/or methods, the appended claims are not necessarily limited to the specific features or methods described. Rather, the specific features and methods are disclosed as example implementations of determining user segmentation based on a photo library, and other equivalent features and methods are intended to be within the scope of the appended claims. Further, various different examples are described and it is to be appreciated that each described example can be implemented independently or in connection with one or more other described examples.

The invention claimed is:

1. In a digital medium environment to determine user segmentation based on a photo library, a method implemented by a device, the method comprising:

accessing metadata of digital images in a photo library maintained in memory on the device;

determining characteristics about a user of the device by analysis of the metadata of the digital images in the photo library, the metadata including information corresponding to the user who captured the digital images, the characteristics representing specific interests of the user from which an identity of the user is determinable based on the user having captured the digital images, and the characteristics maintained as private source information in the memory on the device;

determining a segmentation that correlates the user with one or more user groups based on the characteristics determined about the user, the segmentation including one or more segments that each represent a generalized aspect of the user from which the identity of the user is not determinable; and associating an anonymous identifier with the segmentation effective to maintain anonymity of the user and privacy of the metadata.

2. The method as recited in claim 1, wherein the generalized aspect of the user is attributable to multiple people and the anonymity of the user is maintained.

3. The method as recited in claim 1, further comprising:
maintaining the metadata of the digital images as the private source information that is not collected or combined with other source information from other user devices.

4. The method as recited in claim 1, further comprising:
requesting permission from the user to access the digital images in the photo library.

5. The method as recited in claim 1, further comprising:
receiving an input as user permission to access the digital images in the photo library on the device that is associated with the user.

6. The method as recited in claim 1, further comprising:
receiving an input as user permission to access one or more of the digital images in the photo library that have been designated for access by the user.

7. The method as recited in claim 1, further comprising:
receiving an input as user permission to access one or more of the digital images in the photo library that have been designated as favorite photos.

8. The method as recited in claim 1, further comprising:
receiving an input as one or more of the digital images in the photo library being deselected and omitted from the determining the characteristics about the user.

9. The method as recited in claim 1, further comprising:
communicating the segmentation and the anonymous identifier to a marketing system that generates personalized marketing messages based on the segmentation into the one or more user groups.

10. The method as recited in claim 1, further comprising:
providing an indication to inform the user of the segmentation that correlates the user with the one or more user groups.

11. A device implemented to determine user segmentation based on a photo library in a digital medium environment, the device comprising:

a memory to maintain digital images in a photo library and metadata associated with the digital images;

a processor system configured to execute a segmentation module implemented to:
determine characteristics about a user of the device by analysis of the metadata of the digital images in the photo library, the metadata including information corresponding to the user who captured the digital images, the characteristics representing specific interests of the user from which an identity of the user is determinable based on the user having captured the digital images, and the characteristics maintained as private source information in the memory on the device;

determine a segmentation based on the characteristics determined about the user, the segmentation including one or more segments that each represent a generalized aspect of the user from which the identity of the user is not determinable;

associate an anonymous identifier with the segmentation effective to maintain anonymity of the user and privacy of the metadata; and initiate communication of the segmentation and the anonymous identifier to a marketing system that generates personalized marketing messages based on the segmentation.

12. The device as recited in claim 11, wherein the generalized aspect of the user is attributable to multiple people and the anonymity of the user is maintained.

13. The device as recited in claim 11, wherein the segmentation module is implemented to maintain the metadata of the digital images as the private source information that is not collected or combined with other source information from other user devices.

14. The device as recited in claim 11, wherein the segmentation module is implemented to initiate a request for permission from the user to access the digital images in the photo library.

15. The device as recited in claim 11, wherein the segmentation module is implemented to receive an input as user permission to access the digital images in the photo library on the device that is associated with the user.

16. The device as recited in claim 11, wherein the segmentation module is implemented to receive an input as user permission to access one or more of the digital images in the photo library that have been designated for access by the user.

17. The device as recited in claim 11, wherein the segmentation module is implemented to receive an input as user permission to access one or more of the digital images in the photo library that have been designated as favorite photos.

18. The device as recited in claim 11, wherein the segmentation module is implemented to receive an input as one or more of the digital images in the photo library being deselected and omitted from a determination of the characteristics about the user.

19. A device implemented to determine user segmentation based on a photo library in a digital medium environment, the device comprising:

a memory to maintain digital images in a photo library and metadata associated with the digital images, the metadata including information corresponding to a user who captured the digital images and the metadata maintained as private source information that is not collected or combined with other source information from other user devices;

a processor system configured to execute a segmentation module implemented to:
initiate a request for permission from the user to access the digital images in the photo library;
receive an input as user permission to access the digital images in the photo library;
determine characteristics about the user of the device by analysis of the metadata of the digital images, the characteristics representing specific interests of the user from which an identity of the user is determinable based on the user having captured the digital images; and determine a segmentation that represents the user of the device based on the analysis of the metadata of the digital images in the photo library and the characteristics determined about the user, the segmentation representing a generalized aspect of the user that maintains anonymity of the user.

20. The device as recited in claim 19, wherein the segmentation module is implemented to:

associate an anonymous identifier with the segmentation effective to maintain the anonymity of the user and privacy of the metadata; and initiate communication of the segmentation and the anonymous identifier to a marketing system that generates personalized marketing messages based on the segmentation.

\* \* \* \* \*